United States Patent [19]

Grandfield et al.

[11] Patent Number: 4,727,595

[45] Date of Patent: Feb. 23, 1988

[54] LOCAL OSCILLATOR FEED FOR MIXER ARRAY

[75] Inventors: John Grandfield, Assonet; Leonard L. Blaisdell, Medway, both of Mass.

[73] Assignee: GTE Government Systems Corporation, Waltham, Mass.

[21] Appl. No.: 891,796

[22] Filed: Aug. 1, 1986

[51] Int. Cl.[4] .............................................. H04B 1/26

[52] U.S. Cl. .................................... 455/319; 455/325; 455/328; 332/7.51

[58] Field of Search ............... 455/326, 325, 328, 319, 455/330; 332/7.51

[56] References Cited

U.S. PATENT DOCUMENTS 4,461,039 7/1984 Hersman ............................ 455/330

4,491,977 1/1985 Paul .................................... 455/330

OTHER PUBLICATIONS

Gustincic, "Receiver Design Principles"—SPIE, vol. 105, 1977, pp. 41-43.

Gustincic, "A Quasi-Optical Receiver Design"—IEEE Microwave Theory & Tech. Intern. Microwave Symposium, 1977, pp. 99-101.

*Primary Examiner*—Michael A. Masinick

*Assistant Examiner*—Elissa Seidenglanz

*Attorney, Agent, or Firm*—J. Stephen Yeo

[57] ABSTRACT

Local oscillator power is supplied to an array of single-ended microwave mixers by an offset horn. Each mixer has an integral antenna element.

2 Claims, 3 Drawing Figures

LOCAL OSCILLATOR FEED FOR MIXER ARRAY

BACKGROUND OF THE INVENTION

This invention pertains to microwave systems and, more particularly, is concerned with arrays of microwave mixers.

One use of microwave mixers is conversion of signals at microwave frequency to an intermediate frequency, which usually is the difference between the frequency of the signal and that of a local oscillator. A plurality of mixers are sometimes arranged in an array which functions at a transmitting or receiving antenna.

The conventional method for distributing a local oscillator (LO) signal to many mixers uses a network of power dividers. In array antenna applications, the power divider network often must distribute the LO energy to hundreds or thousands of mixers. Power loss, weight, phasing, and space all become important considerations. The loss of power dividers required to feed many mixers dictate the need for a high-power local oscillator.

Another method to provide local oscillator power is to integrate an injection locked oscillator (ILO) with each mixer, each which is phase-locked to a common reference signal.

Both of these methods suffer from two problems particularly at millimeter wave frequencies. First, both are very costly, the ILO system being the more expensive of the two. Second, in constrained space applications such as exist in millimeter wave array antennas, it is often not physically feasible to use either of these methods.

An objective of the invention is to distribute a common LO signal to a plurality of mixers such as those in an array antenna without the losses associated with power divider networks.

DETAILED DESCRIPTION OF INVENTION

Figure 1:
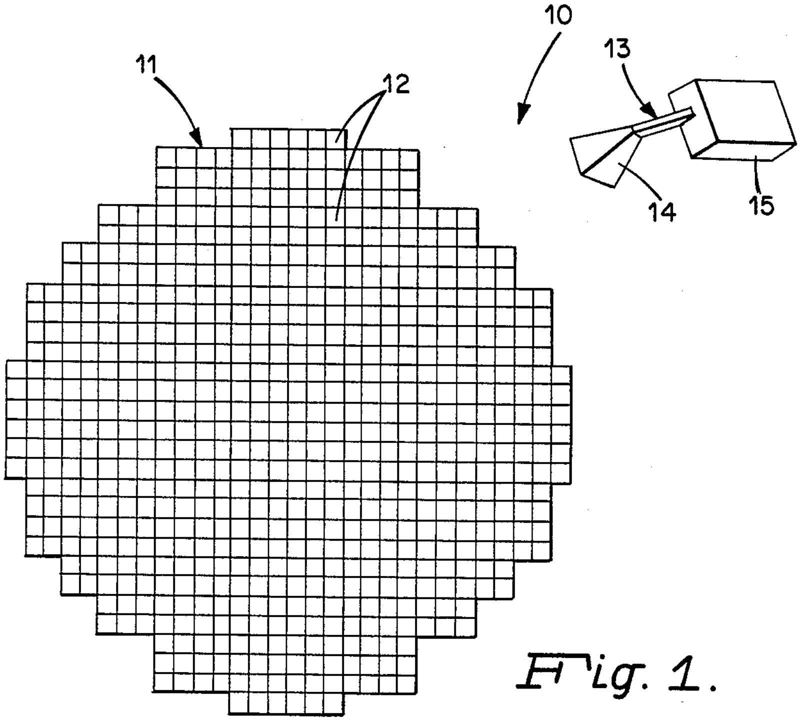
FIG. 1 is a representation of an an array of mixers and LO feed embodying the invention.

FIG. 1 is a pictorial representation of an embodiment of the invention in which a microwave system 10 has a circular array 11 of microwave horns with mixers 12. As a feature of the invention, local oscillator (LO) power is provided to the mixers by a space feed local oscillator injection system 13. A single waveguide horn 14 is located in front, but upward and to one side, of the center of array. The horn 14 transmits an LO signal coupled from local oscillator 15, and injects it into each mixer through a rf port. The space feed local oscillator injection system 13 completely eliminates the need for a corporate feed power divider network or a multiplicity of ILO's. It solves the space constraint and loss problems and eliminates costly items particularly when there are a large number of mixers.

Figure 2:
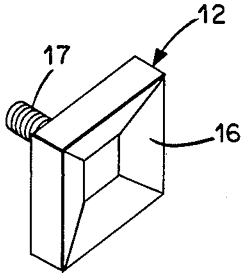
FIG. 2 is a view of one of the mixers of FIG. 1.

Turning to FIG. 2, there is seen a representative mixer of array 11. Each mixer 12 is the single ended type in which both the LO and the signal share a common rf port which is an integral antenna element 16 such as a waveguide horn, not to be confused with the LO horn 14. Each element 16 is an antenna and as such has gain and polarization. The intermediate frequency is coupled out through I.F. port 17

As a specific example, an array 11 of approximately a thousand of Ka band mixers are arranged in a circular array 11 approximately twelve inches in diameter. The phase center of the LO horn 14 may be located twenty inches off the array's center in both the vertical and horizontal directions and about forty inches from the plane of the array. LO energy emitted by LO horn 14 illuminates all the mixer ports but not necessarily with the same intensity. The path loss to the center of the mixer array at the LO frequency may be determined as follows. The angles from the LO horn phase center to the top and bottom elements of the mixer array of the example are 19.3 degrees and 33.0 degrees, respectively. To illuminate the top and bottom elements of the array at approximately the 3-dB points of the LO horn pattern, the 3-dB beamwidth in the vertical plane must therefore be 13.7°. The required 3-dB beamwidth in the horizontal plane is 14.9°. A LO horn with a gain of approximately 20 dB provides such a beamwidth. This gain plus that of the array elements mitigate to a great extent any path loss between the LO horn and the mixer array.

In operation, the LO signal is transmitted from the LO horn to the antenna elements in the array. To determine how much LO power is required to assure a desired minimum power to each mixer, the array element pattern as well as its gain and the difference in path lengths between the top, bottom and side elements of the array are taken into account. Reflecting these characteristics into the geometry of the particular configuration, the required LO power for the "worst case" mixer may be determined. In the example as described above, an antenna element on the periphery of the array will receive LO power 3-dB lower than an element at the center of the array.

If the mixer rf elements are circularly polarized at the operating signal frequency, it is not necessary that polarization work at the LO frequency. If, at the LO frequency the element 16 is linearly polarized, the LO horn may be linearly polarized to match it. In practice, the LO horn 14 and antenna element 16 polarizations may be matched at the LO frequency whatever the array element polarization ellipticity.

If the array is used for transmission as well as reception signal rejection means such as a diplexer, isolator, or circulator may be located behind the LO horn to reject the array transmission.

Figure 3:
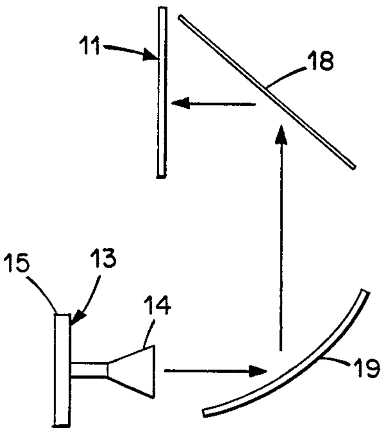
FIG. 3 is a schematic view of another embodiment of the invention.

Other embodiments of the invention are possible. As depicted in FIG. 3, a frequency selective reflector 18 (FSR) may be located in front of the array aperture. The frequency selection of the FSR 18 is such that the operating signal frequency passes through the FSR, while the LO frequency is reflected. The phase center of the LO horn 14 is located behind the primary radiating aperture. A conical section mirror 19 is located in front of the LO horn 14 and arranged to reflect LO power to FSR 18 which illuminates the input surface of the array. By using an elliptical surface on mirror 19, a plane wave with a prescribed amplitude taper may be placed across the total array surface while eliminating most of the spillover loss between the LO horn 14 and array 11.

The practice of this invention eliminates the costly and complex corporate feed power divider system normally used to distribute the LO signal to a multiplicity of mixers by replacing it with a single LO feed horn.

The result of this is not only a reduction in cost and net RF system loss, but also an LO space feed injection system that can be used in applications such as millimeter array antennas in which space constraints make it not feasible to use conventional methods.

Other embodiments of the invention will be apparent to those skilled in the art. Accordingly, the scope of the invention is to be determined by the claims.

What is claimed is:

1. A microwave system comprised of:

an array of a plurality of single ended mixers including corresponding antenna elements;

a local oscillator for generating local oscillator frequency energy; and a microwave horn coupled to said local oscillator and offset form the center of said array and arranged to illuminate said antenna elements with local oscillator frequency energy.

2. The antenna of claim 1 which is further comprised of a conical section reflector arranged to reflect energy beamed from said horn; and a frequency selective reflector arranged to reflect the reflected local oscillator frequency beam from said conical section reflector to said antenna elements and to pass signal frequency.

* * * * *